United States Patent [19]

Miyazaki et al.

[11] Patent Number: 5,018,033

[45] Date of Patent: May 21, 1991

[54] GUIDE MECHANISM FOR HEAD TRANSFER APPARATUS

[75] Inventors: Benichi Miyazaki; Hiroshi Yamamoto; Shoji Goto, all of Osaka, Japan

[73] Assignee: Matsushita Electric Industrial Co., Ltd., Kadoma, Japan

[21] Appl. No.: 401,610

[22] Filed: Sep. 5, 1989

[30] Foreign Application Priority Data

Sep. 2, 1988 [JP] Japan ............................... 63-220948

[51] Int. Cl.⁵ .............................................. G11B 5/55
[52] U.S. Cl. .................................................. 360/106
[58] Field of Search ................................. 360/105, 106

[56] References Cited

U.S. PATENT DOCUMENTS 4,415,821 11/1983 Wedman et al. .................... 360/105

FOREIGN PATENT DOCUMENTS 62-47878 3/1987 Japan .
62-109267 5/1987 Japan .

OTHER PUBLICATIONS

Norwood, "Magnetic Actuator Preload", IBM TDB, Apr. 1980, vol. 22, No. 11, p. 4832.

Primary Examiner—David J. Severin
Attorney, Agent, or Firm—Cushman, Darby & Cushman

[57] ABSTRACT

A head transfer apparatus includes a magnetic substance disposed on a movable unit assembly driven by a magnetic circuit in a tracking direction. The magnetic substance is operative, under the force of a leakage flux of the magnetic circuit, to produce a magnetic force to urge a bearing of the movable unit assembly against a guide, thereby controlling a clearance between the bearing and the guide or lowering a bearing pressure imposed on the bearing by the weight of the movable unit assembly.

2 Claims, 5 Drawing Sheets 5,018,033

GUIDE MECHANISM FOR HEAD TRANSFER APPARATUS

BACKGROUND OF THE INVENTION

1. Field of the Invention

The present invention relates to a head transfer apparatus for transferring a head for recording information on any appropriate information track of a recording medium, regenerating the recorded information from the information track or erasing the recorded information on the track.

2. Description of the Prior Art

Head transfer apparatus are widely known which include a guide means composed of a plain bearing and a guide cooperative to guide a movable unit with an element for recording information on any appropriate information track of a recording medium, regenerating the recorded information from the information track or erasing the recorded information of the track. Such a known guide means is simple in construction and can be manufactured at a low cost. However, the guide means involves a certain clearance between the bearing and the guide which then causes a wobbling motion between the bearing and the guide, hindering smooth movement of the movable unit. Another drawback associated with the known guide means is that due to the clearance, the bearing and the guide chatter each other when subjected to vibration or impact.

The plain bearing based on sliding action involves sliding friction so that it is subjected to a great bearing force imposed thereon by the weight of the movable unit. Since the weight of the movable unit continuously acts on an interface between the guide and the bearing, the bearing life is considerably reduced.

In order to overcome the drawbacks resulted from the clearance between the bearing and the guide, an improvement has been proposed as disclosed in Japanese Patent Laid-open Publication No. 62-47878 (hereinafter referred to as "first prior art"), wherein head transfer apparatus includes means for limiting the clearance between a plain bearing and a guide that are cooperative to guide movement of a movable guide unit having an objective lens for collecting a light beam onto a desired information track on the recording medium.

The clearance limiting means comprises a pair of burr-like annular resilient projections extending radially inwardly from opposite edges of an axial through-hole of the bearing. The annular projections are made of plastic and have an inside diameter slightly smaller than the outside diameter of a guide extending through the through-hole. The burr-like annular resilient projections fit over the periphery of the guide and resiliently support the latter under the resiliency acting radially inwardly toward a longitudinal axis of the guide, thereby eliminate the clearance between the through-hole in the bearing and the guide. The annular resilient projections can readily be fromed by injection molding, for example, into integral formation with the body of the bearing.

According to the first prior art, the bearing slidably supported on the guide is formed of synthetic resin and has the resilient projections for resiliently restricting the position of the guide relative to the bearing. With this construction, the movable unit is light in weight, inexpensive to manufacture and slidable smoothly without wobbling which would otherwise occurs due to the presence of a certain clearance between the bearing and the guide.

The guide means according to the first prior art is however still unsatisfactory in that a continuous operation of the head transfer apparatus results in a progressive wear of the plastic resilient projections which then produces a clearance between the bearing and the guide. The guide means involving the clearance is not reliable in operation.

Another type of conventional guide means used for guiding movement of a movable unit includes a ball bearing and a guide extending through a central hole of the ball bearing. The guide means includes a presser plate spring for urging the bearing against the guide to thereby control a clearance therebetween. The perpendicular pressure or bias imposed on the bearing varies with the force of the presser plate spring with the result that friction acting on a transfer mechanism is cause to fluctuate. Accordingly, the movable unit is transferred at non-uniform speeds, thus making it difficult to achieve an uniform access operation.

Japanese Patent Laid-open Publication No. 62-109267 (hereinafter referred to as "second prior art") discloses one solution to overcome the foregoing drawback which is resulted from the varying perpendicular pressure acting on the bearing when the clearance between the bearing and the guide is controlled. According to the disclosed solution, a head transfer apparatus is provided with a ball bearing for guiding movement of a movable unit, and means for exerting a constant perpendicular bias on the bearing to thereby control a clearance between the bearing and a guide in such a manner as to enable a uniform access operation.

The clearance controlling means according to the second prior art includes a magnetic substance disposed on a movable unit, and a permanent magnet disposed on the outside of the movable unit in confronting relation to the magnetic substance. Under the influence of the magnetic flux produced from the permanent magnet, the magnetic substance is caused to produce a magnetic force acting to impose a constant perpendicular pressure or bias on the bearing to keep the latter in contact with the guide while the bearing is rotating.

Since the perpendicular bias can be obtained the clearance controlling means which is held out of contact with the bearing and the guide, the head transfer apparatus of the second prior art does not involve undesirable fluctuation of the perpendicular pressure or bias.

However, since the permanent magnet is necessary in addition to the magnetic substance, the head transfer apparatus includes an increased number of components, and hence is costly to manufacture and large in size.

SUMMARY OF THE INVENTION

With the foregoing difficulties in view, an object of the present invention is to provide a head transfer apparatus of the type having a bearing and a guide cooperating to guide the movement of a movable unit assembly having an element for recording information on any appropriate information track of a recording medium, regenerating the recorded information from the information track or erasing the recorded information on the track, which apparatus is composed of a small number of components, inexpensive to manufacture, simple in construction and small in size, further is capable of withstanding severe operating conditions (e.g., prolonged operation time, high temperature or low temperature) and also is capable of substantially controlling a clearance between the bearing and the guide to avoid wobbling between the bearing and the guide.

The foregoing object is attained according to the present invention by a head transfer apparatus which comprises: a movable unit assembly including an element for recording information on any appropriate information track of a recording medium, regenerating the recorded information from the information track or erasing the recorded information on the track; an access coil disposed on the movable unit assembly; a magnetic circuit for causing the access coil to produce an electromagnetic force effective to transfer the movable unit assembly in a first direction perpendicular to the information track; a bearing disposed on the movable unit assembly; a guide extending through the bearing for slidably supporting the movable unit assembly in the first direction; and a magnetic substance disposed on at least one portion of the movable unit assembly and operative, under the force of a leakage flux of the magnetic circuit, to produce a magnetic force acting in a second direction to urge at least one portion of the bearing against the guide.

As described above, the bearing is urged against the guide by the magnetic force produced in the magnetic substance by utilizing the leakage magnetic flux of the magnetic circuit. With this construction, it is possible to construct the head transfer apparatus with a small number of components. Further, the clearance between the bearing and the guide can be controlled uniformly and reliably even when the head transfer apparatus is used under severe operating conditions.

Another object of the present invention is to provide a head transfer apparatus which is capable of reducing the bearing pressure produced between the bearing and the guide under the influence of the weight of the movable unit assembly.

This object is attained according to a modified embodiment of the present invention by the magnetic substance which is disposed in a position to produce, under the force of the leakage flux of the magnetic circuit, a magnetic force acting in a direction opposite to the direction of gravity in which the weight of the movable unit assembly acts, thereby lowering the bearing load imposed by the weight of the movable unit assembly.

Many other advantages and features of the present invention will become manifest to those versed in the art upon making reference to the detailed description and the accompanying sheets of drawings in which a preferred structural embodiment incorporating the principles of the present invention is shown by way of illustrative example.

DESCRIPTION OF THE PREFERRED EMBODIMENTS

Figure 1:
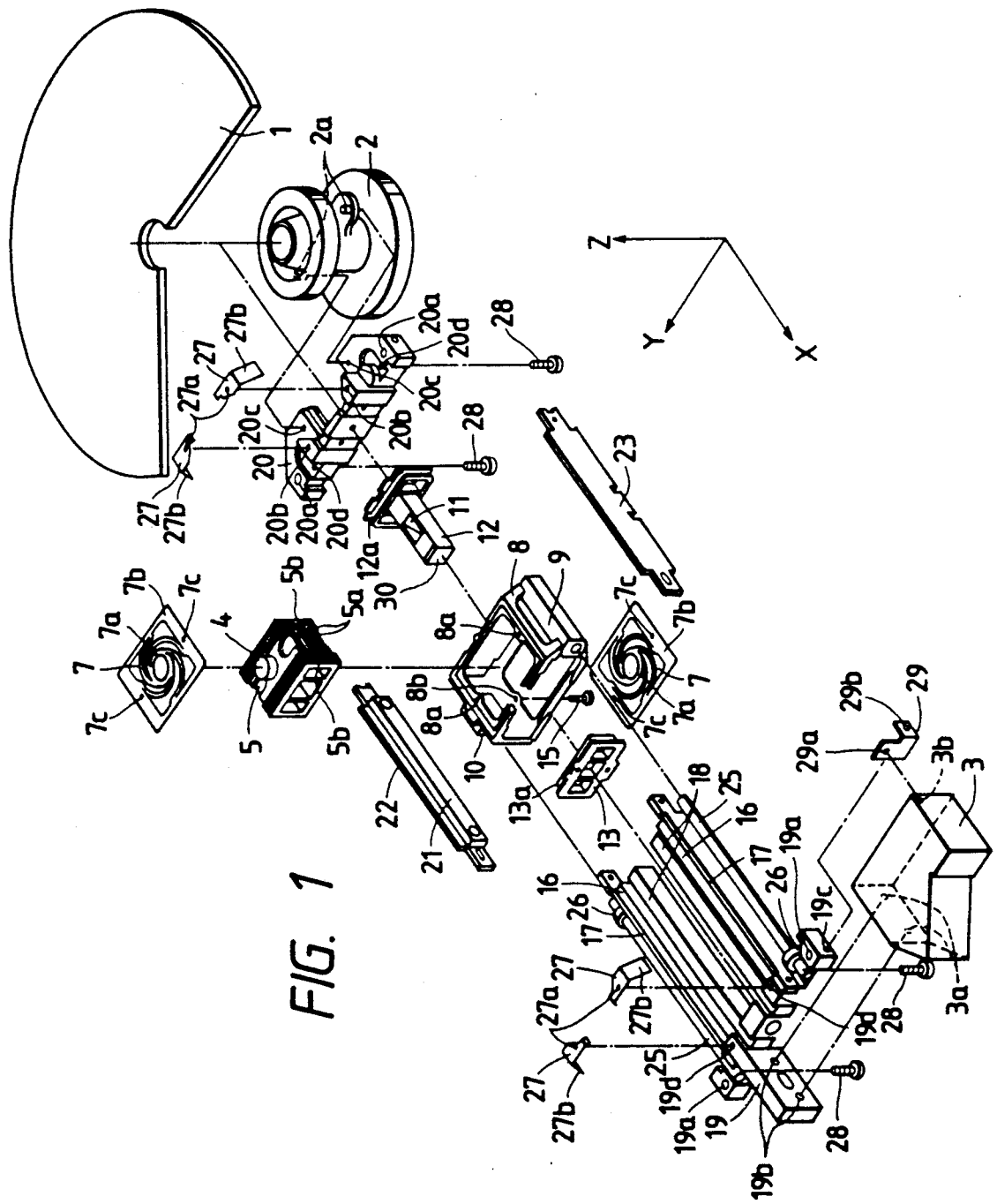
FIG. 1 is an exploded perspective view of a head transfer apparatus according to the present invention.

Referring now to the drawings, wherein like reference characters designate like or corresponding parts throughout the several views, FIGS. 1 through 5 show a head transfer apparatus according to a first embodiment of the present invention. The head transfer apparatus is incorporated in a recording/regenerating device and includes a movable assembly (described later on) to be positioned to any appropriate information tracks on a recording medium 1. As obvious from the respective drawing figures, the term "X-direction" is used herein to refer to a direction perpendicular to the information tracks of the recording medium 1, this direction being called as "tracking direction". The term "Z-direction" is used to refer to a direction perpendicular to a plane of the recording medium 1, this direction being called as "focus direction". Likewise, the term "Y-direction" is used herein to refer to a direction parallel to both the X-direction and the Z-direction and extending tangentially to the information tracks of the recording medium 1. Further, the direction of gravity in which the weight of the movable unit assembly acts is referred to as "Z−(minus) direction" which faces vertically downwards of the surface of the recording medium 1. Conversely, the term "Z+(plus) direction" is used herein to refer to a direction opposite to the Z−(minus) direction, namely a direction facing vertically upwardly of the surface of the recording medium 1.

The recording medium 1 in the illustrated embodiment comprises an optical disk having a spiral information track or a number of concentric information tracks on at least one surface thereof. The recording medium 1 is adapted to be rotated by a disk motor 2 secured to a side yoke 20 via a pair of holes 2a in the disk motor 2 and a pair of threaded holes 20c in the side yoke 20.

The head transfer apparatus includes a fixed optical unit 3 having a fixed housing in which a semiconductor laser serving as a light source, a photodetector for detecting a reflected light from the recording medium 1, and an optical element such as a prism for dispersing a light beam from the semiconductor laser into parallel rays are disposed in a manner known per se. The fixed optical unit 3 is screwed to another side yoke 19 via a pair of threaded holes 3a in the fixed optical unit 3 and a pair of holes 19b in the side yoke 19. The fixed optical unit 3 further has a threaded hole 3b through which a fixed optical unit-supporting spring 29 is screwed to the fixed optical unit 3.

The head transfer apparatus further includes a movable bobbin 5 having an objective lens 4 mounted thereon for collecting a light beam onto a desired point on the recording medium 1. The objective lens 4 is firmly received in one end of a cylindrical portion of the bobbin 5 which faces the recording medium 1 in the Z-direction. The movable bobbin 5 has wound thereon a pair of focusing coils 5a for driving the movable bobbin 5 in the Z-direction, and a pair of tracking coils 5b for driving the movable bobbin 5 in the X-direction. For the dynamic balancing of the movable bobbin 5, a counter weight 6 (FIG. 3) is disposed in the opposite end of the cylindrical portion of the movable bobbin 5 in confrontation to the objective lens 4, the counter weight 6 facing away from the laser disc 1 in the Z-direction.

The head transfer apparatus also includes a pair of focusing plate spring units 7 having three-layered sandwich structure which is composed of a focusing plate spring, a damping rubber for dampening or lessening the resonant oscillation of the focusing plate spring, and an auxiliary spring for reinforcing a peripheral portion of the focusing plate spring. The focusing plate spring of each spring unit 7 includes an annular central portion 7a and a hollow rectangular peripheral portion 7b connected to the central portion 7a by means of a plurality of intermediate portions in the form of narrow spiral strips (not designated). One of the focusing plate spring units 7 is secured to one end of the cylindrical portion of the bobbin 5 on the same side as the object lens 4, with its annular central portion 7a bonded to an outer peripheral surface of the cylindrical portion. The other focusing plate spring units 7 is secured to the opposite end of the cylindrical portion of the bobbin 5 on the same side as the counter balance 6, with its annular central portion 7a bonded to the outer peripheral surface of the cylindrical portion. Each of the focusing plate spring units 7 has a pair of positioning holes 7c for positioning the peripheral portion 7b with respect to a carriage 8 when the focusing plate spring 7 is attached to the carriage 8. One of the positioning holes 7c is a circular hole and the other positioning hole 7c is an oblong hole.

The carriage 8 has a hollow rectangular body for receiving therein the movable bobbin 5. The carriage 8 has a surface facing the recording medium 1 in the Z-direction and secured by bonding the peripheral portion 7b of one of the focusing plate spring units 7, and an opposite surface facing away from the recording medium 1 in the Z-direction and secured by bonding to the peripheral portion 7b of the other focusing plate spring unit 7. The carriage 8 includes three bosses 8a for positioning the peripheral portion 7b of each focusing plate spring unit 7 when they are bonded to the carriage 8. The carriage 8 further has a hole 8b into which a magnetic substance 15 is press-fitted. An elongate bearing 9 is formed with a pair of cylindrical plain bearing portions at opposite ends thereof and is secured by bonding to one side of the carriage 8. A bearing 10 is secured by bonding to the opposite side of the carriage 8 and extends in a direction parallel to the Z-direction for preventing the carriage 8 from turning about an axis extending parallel to the X-direction.

A reflecting mirror 11 is secured by bonding to an access coil bobbin 12 for receiving a light beam projected in the X-direction from the fixed optical unit 3 and reflecting the light beam to the Z-direction. The access coil bobbin 12 has wound thereon a rectangular access coil 12a for driving the carriage 8 in the X-direction and is secured by bonding to one side of the carriage 8. Another access coil bobbin 13 is secured by bonding to the opposite side of the carriage 8 and carries thereon a rectangular access coil 13a. A light emitting diode 14 (FIG. 3) is mounted on a printed wiring board (not designated) secured by bonding to the bearing 10.

The magnetic substance 15 press-fitted to the carriage 8 comprises a cylindrical bush member made of iron. The magnetic substance 15 also serves as a positioning boss for positioning one of the focusing plate spring units 7 in a manner same as the three bosses 8a stated above.

A pair of parallel spaced elongate magnets 16, a pair of parallel spaced elongate back yokes 17, a pair of confronting yokes 18 and the side yokes 19, 20 jointly form or complete a magnetic circuit. The thus-formed magnetic circuit enables the access coils 12a, 13a to generate an electromagnetic force to drive the carriage 8 in the X-direction when the access coils 12a, 13a are excited. Likewise, with the magnetic circuit, the focusing coils 5a and the tracking coils 5b when excited produce two electromagnetic forces to drive the movable bobbin 5 in the Z-direction and the X-direction, respectively. In the magnetic circuit, the magnetic flux is generally channeled in a path extending from the magnets 16 to the confronting yokes 18 and returns therefrom to the magnets 16 successively through the side yokes 19, 20 and the back yokes 17. However, a part of the magnet flux is not channeled in the path and leaks oppositely in the Z-direction. That part of the leakage flux which leaks in the Z−(minus) direction produces a magnetic force acting on the magnetic substance to pull or attract the latter in the Z+(plus) direction.

To form the magnetic circuit, the back yokes 17 are made of magnetic soft iron and secured by bonding to the corresponding magnets 16. The confronting yokes 18 are made of magnetic soft iron and disposed in confrontation to the corresponding magnets 16a.

The side yoke 19 is made of magnetic soft iron and screwed to respective one ends of the back yokes 17 and the confronting yokes 18. The side yoke 19 has a pair of holes 19a through which the side yoke 19 is screwed to a body (not shown) of the recording/regenerating device. The two holes 19b of the side yoke 19 are used for screwing of the fixed optical unit 3 as described above. One of the holes 19b has a standard hole engageable with a set screw without play, the other hole 19b having a diameter larger than the diameter of the set screw so that the fixed optical unit 3 is angularly movable about an axis extending parallel to the Y-direction to adjust an angle of inclination relative to the side yoke 19. The side yoke 19 further has a hole 19c used for screwing of the fixed optical unit-supporting spring 29, and a pair of threaded holes 19d for screwing a pair of guide-supporting springs 27.

The side yoke 20 is made of magnetic soft iron and screwed to the respective other ends of the back yokes 17 and the confronting yokes 18. The side yoke 20 has a pair of holes 20a through which the side yoke 20 is screwed to the non-illustrated body of the recording/regenerating device. The side yoke 20 further has a pair of threaded holes 20b for screwing another pair of guide-supporting springs 27 to the side yoke 20. In addition to the threaded holes 20c used for the screwing of the disk motor 2 as stated above, the side yoke 20 has a pair of threaded holes 20d into which a pair of adjustment screws 28 is threaded respectively.

Figure 2:
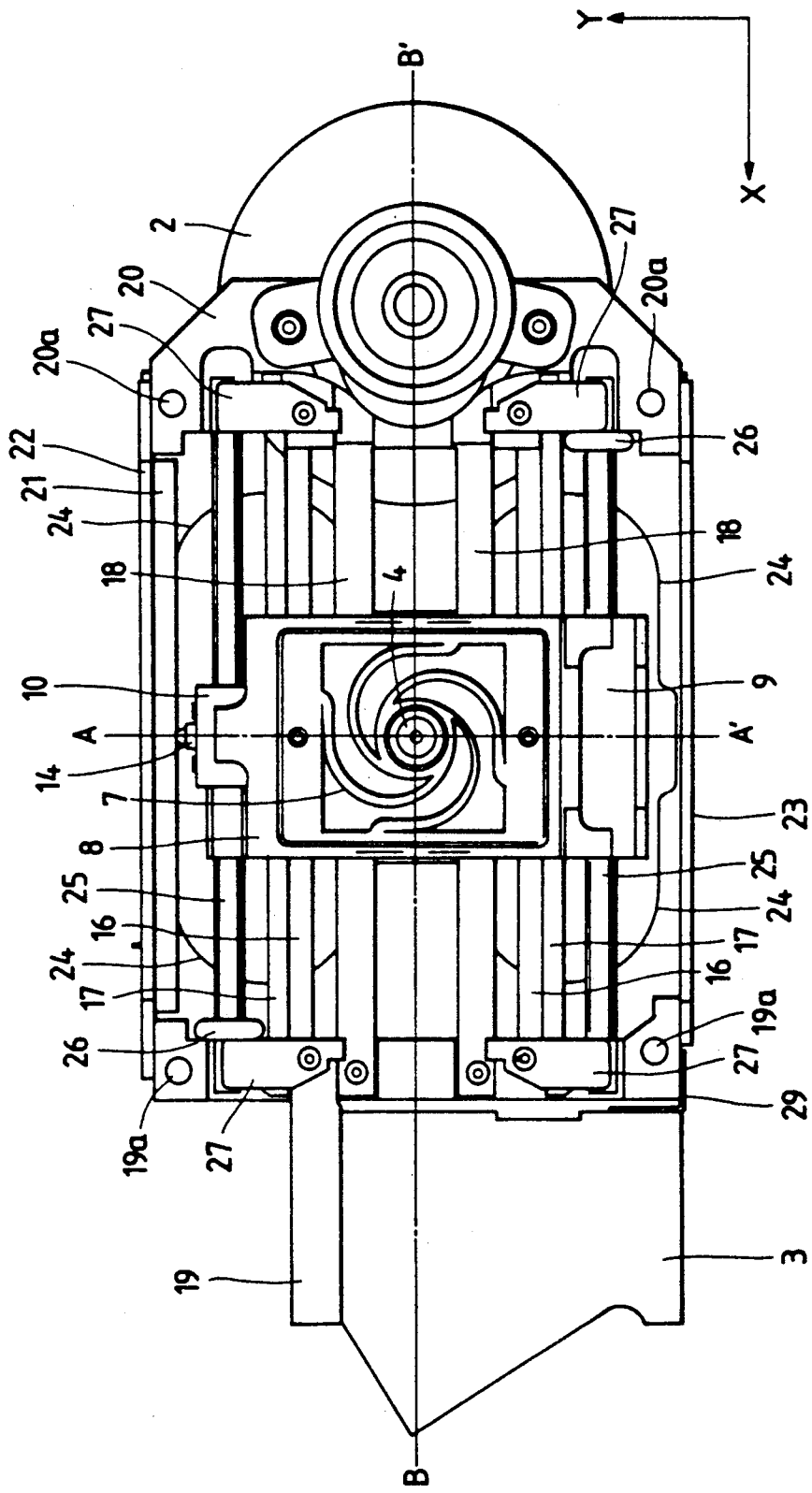
FIG. 2 is a plan view of the head transfer apparatus shown in FIG. 1.
Figure 3:
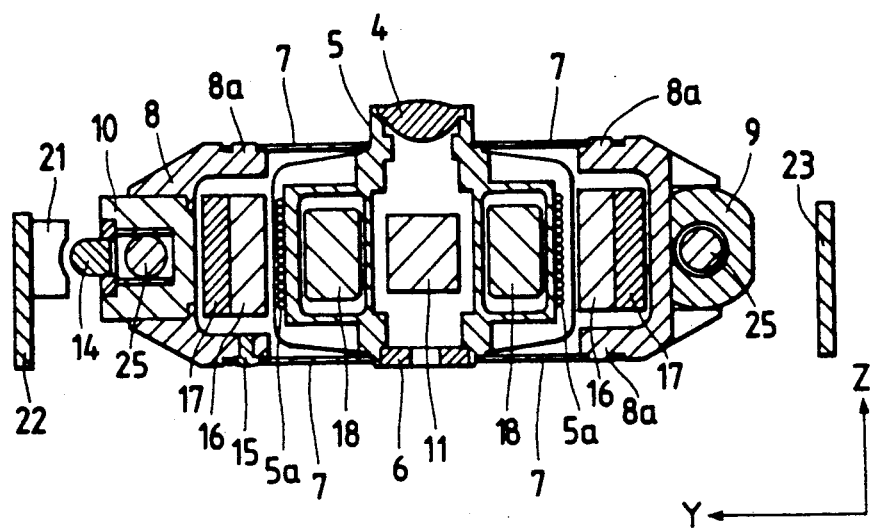
FIG. 3 is a cross-sectional view taken along line A—A' of FIG. 1.

An elongate optical position detector 21 has a light receiving surface confronting the light emitting diode 14 for detecting the light from the light emitting diode 14 to thereby detect the position of the carriage 8 in the X-direction. The optical position detector 21 is mounted on a printed wiring board 22 which serves as a junction for wiring of a driver conductor and a signal conductor of the optical position detector and conductors joined with flexible cables 24 (FIG. 2). The printed wiring board 22 is screwed at opposite ends to the side yoke 19 and the side yoke 20. A printed wiring board 23 is used as a junction for the wiring of conductors joined with other flexible cables 24 (FIG. 2). The printed wiring board 23 is screwed at opposite ends to the side yoke 19 and the side yoke 20. The flexible cables 24 interconnect driver conductors of the light emitting diode 14, the focusing coils 5a, the tracking coils 5b and the access coils 12a, 13a.

A pair of guides 25 extends through the bearings 9 and 10, respectively for supporting the carriage 8. The carriage 8 thus supported is slidably movable in the X-direction. The guides 25 are in the form of cylindrical rods and each have a rubber ring stopper 26 fitted over a corresponding one of the guides 25 for limiting the scope or extent of sliding movement of the carriage 8 in the X-direction. The four guide-supporting springs 27 screwed in pair to the side yoke 19 and the side yoke 20, respectively, via holes 27a in the respective guide-supporting springs 27 and the threaded holes 19d in the respective side yokes 19, 20. Each of the guide-supporting spring 27 has an oblique resilient supporting portion 27b resiliently engaging the corresponding guide 25 to restrict the movement of the guide 25 in the Z-direction and the Y-direction. The movement of each guide 25 in the Y-direction is restricted jointly by the guide-supporting springs 27 resiliently engaging the guide 25 to form one end of the movement, and a side surface confining the other end of the movement. One pair of the adjustment screws 28 are threaded into a pair of threaded holes (not shown) in the side yoke 19 and the other pair of adjustment screws 28 are threaded into the threaded holes 20d in the side yoke 20 so that the movement of the guides 25 in the Z-direction is restricted jointly by the adjustment screws 28 and the guide-supporting springs 27. The adjustment screws 28 have an effective screw length longer than the depth of the non-illustrated threaded holes in the side yoke 19 and the depth of the threaded holes 20d in the side yoke 20. Accordingly, the position of the guide 25 is adjustable in the Z-direction by changing the setting position of the adjustment screws 28.

The fixed optical unit-supporting spring 29 comprises a plate spring bent into an L-shape for interconnecting the side yoke 19 and the fixed optical unit 3. With this L-shaped an L-shaped plate spring 29, the fixed optical unit 3 is secured by screwing to the side yoke 19 at two remote portions corresponding in position to the holes 19b and the threaded hole 19c, respectively. Such a joining structure is stable against vibration and shock. In order to protect the reflecting mirror 11 against duct, a dusttight glass plate 30 is bonded to the front end of the access coil bobbin 12.

The movable unit assembly which is driven by driving forces produced by the focusing coils 5a, tracking coils 5b and the access coils 12a, 13a generally comprises two movable units. The first movable unit is a unit supported by the pair of focusing plate spring units 7 and formed in integral formation by the objective lens 4, the counter weight 6, the movable bobbin 5, the focusing coils 5a and the tracking coils 5b. The second movable unit is formed in integral formation by the carriage 8, the bearing 9, the bearing 10, the reflecting mirror 11, the access coil bobbin 12, the access coil bobbin 13, the light emitting diode 14, the magnetic substance 15, the dusttight glass plate 30 and the access coils 12a, 13a.

The head transfer apparatus of the foregoing construction operates as follows. When a drive current is supplied to the focusing coils 5a, a drive force acting in the Z-direction is produced in the focusing coils 5a by an electromagnetic interaction between the electric circuit and the magnetic circuit. In this instance, since the intermediate spiral strip portions of the focusing plate spring units 7 which support the first movable unit with respect to the second movable unit are greatly flexible in the Z-direction, the intermediate spiral strip portions are resiliently deformed in the Z-direction by the drive force, thereby moving the first movable unit in the Z-direction.

When a drive current is supplied to the tracking coils 5b, a drive force acting in the X-direction is produced in the tracking coils 5b by the electromagnetic interaction between the electric circuit and the magnetic circuit. In this instance, the drive force is transmitted from the tracking coils 5b to the second movable unit via the focusing plate spring units 7 if the focusing plate spring units 7 are oscillated at a frequency lower than a resonant frequency (about 1 KHz) of the focusing plate spring units 7 in the X-direction which is determined by the stiffness of the intermediate spiral strip portions of the focusing plate spring units in the X-direction, the mass of the first movable unit, and the mass of the second movable unit. Conversely, when the focusing plate spring units 7 oscillate at a frequency higher than the resonant frequency, they are functionally equivalent to a non-existing state with the result that the drive force produced in the tracking coils 5b is not transmitted to the second movable unit 2.

When the access coils 12a, 13a are supplied with a drive current, there is produced in the access coils 12a, 13a a drive force acting in the X-direction under the electromagnetic interaction between the electric circuit and the magnetic circuit. Unlike the tracking coils 5b, the drive force thus produced in the access coils 12a, 13a is transmitted to the first movable unit via the focusing movable unit if the focusing plate spring units 7 oscillate at a frequency lower than their resonant frequency in the X-direction. Conversely, when the focusing plate springs units 7 oscillate at a frequency higher than the resonant frequency, the focusing plate spring units 7 are functionally equivalent to a non-existing state. Consequently, the drive force in the access coils 12a, 13a is not transmitted to the first movable unit.

So far as the X-direction is concerned, the state of the movable unit assembly is changed at the resonant frequency of the focusing plate spring units 7 in the X-direction. Now, this resonant frequency is referred to as a crossover resonance. At a frequency higher than the crossover resonance, both of the first and second movable units are oscillated. On the other hand, at a frequency lower than the crossover resonance, only one movable unit of the drive side is oscillated. Thus, when an access to any appropriate information track of the recording medium 1 is desired, the access coils 12a, 13a and the tracking coils 5b are supplied with an adequate amount of drive current to vary the position of the first movable unit and the position of the second movable unit to meet with the desired information track.

Figure 5:
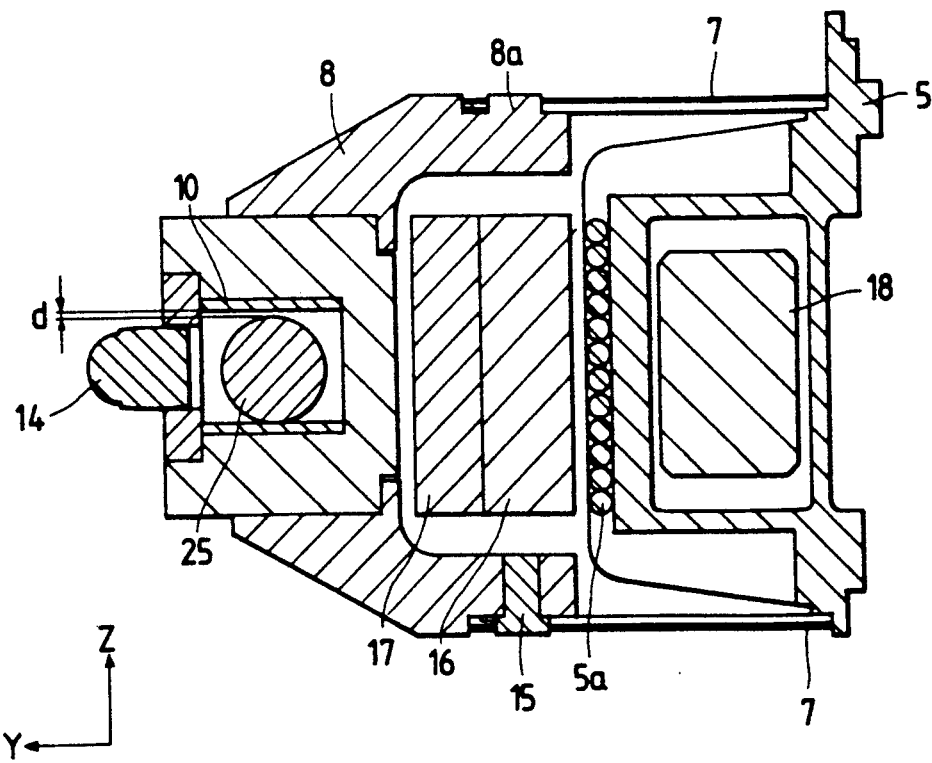
FIG. 5 is an enlarged cross-sectional view of a portion of FIG. 3, showing a bearing portion of the head transfer apparatus.
Figure 4:
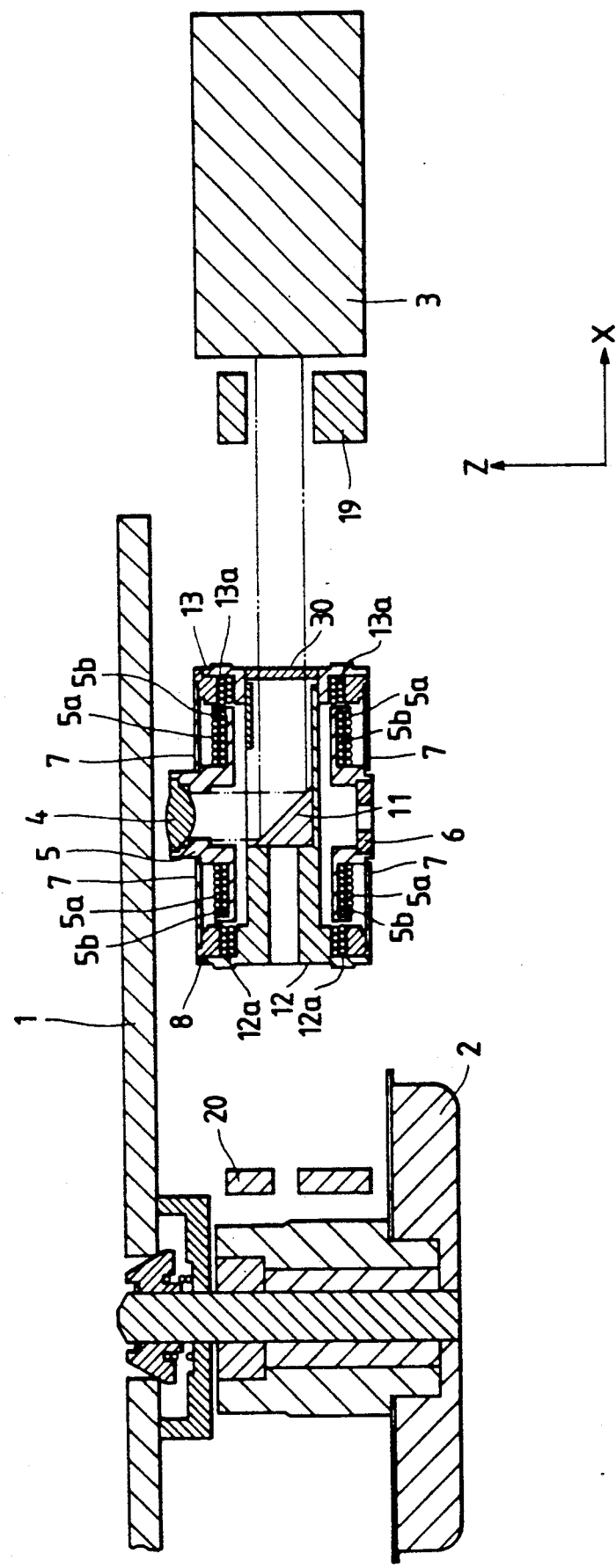
FIG. 4 is a cross-sectional view taken along line B—B' of FIG. 1.

As shown in FIG. 5, there is a clearance d between the bearing 10 and the guide 25 which may cause wobbling between the bearing 10 and the guide 25 if the clearance d is uncontrolled. This clearance d is controlled according to the invention by a magnet for acting on the magnetic substance 15. Stated more specifically, that part of the leakage flux which leaks in the Z−(minus) direction from the magnetic circuit including the magnets produces a magnetic pulling or attracting force acting on the magnetic substance 15 in the Z+(plus) direction. The intensity of this attracting force can be varied by changing the distance between the magnetic substance 15 and the magnetic circuit, the size of the magnetic substance 15, or the amount of leakage flux which varies with the thickness of each yoke constituting a part of the magnetic circuit. The intensity of the attracting force acting on the magnetic substance 15 in the Z+(plus) direction is set to a value slightly larger than the weight of the movable unit assembly acting on the bearing 10 in the Z−(minus) direction, so that the bearing 10 is continuously held in contact with the guide 25 at its Z−(minus) direction side, with a bearing load smaller than the weight of the movable unit assembly. This contacting condition can be maintained reliably and continuously because the magnetic attracting force permanently acts on the magnetic substance 15 even when the clearance d between the bearing 10 and the guide 25 is enlarged due to abrasive wear caused during the prolonged period of use or due to differential thermal expansion occurring when the movable unit assembly is used under high temperature condition.

Consequently, the movable unit assembly as a whole, namely the first and second movable units is driven to move in the X-direction smoothly without the occurrence of any difficulty even when subjected to vibration or shock force tending to impinge the bearing 10 and the guide 25. Since the weight of the movable unit assembly acting on the bearing 10 can be taken up or cancelled, the bearing pressure is considerably reduced even though the bearing 10 is a plain bearing based on sliding motion involving sliding friction. Accordingly, the bearing 10 has a long service life.

Figure 6:
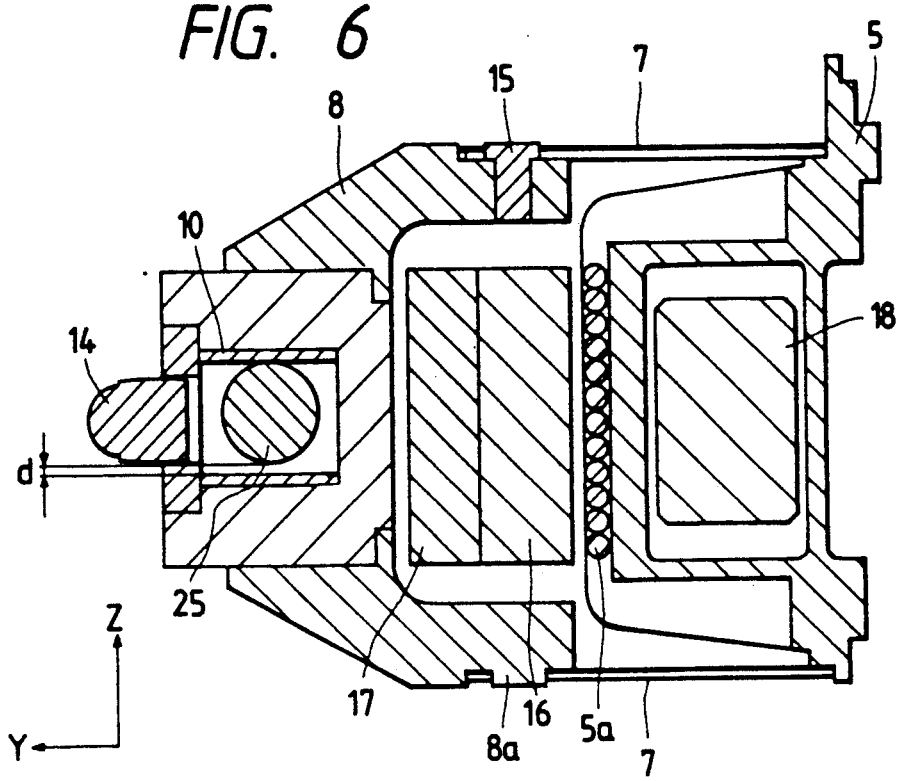
FIG. 6 is a cross-sectional view similar to FIG. 5, but showing a bearing portion according to another embodiment of the present invention.

In the first embodiment described above, the magnetic substance 15 is disposed on the Z−(minus) side of the bearing 10 for producing a magnetic pulling or attracting force which acts on the magnetic substance 15 in the Z+(plus) direction and has an intensity slightly greater than the load or weight of the movable unit assembly acting on the bearing 10 in the Z−(minus) direction. The present invention is not limited to the foregoing embodiment. Rather, in case of necessity, it is possible according to the invention to dispose the magnetic substance 15 at the Z+(plus) side of the bearing 10, as shown in FIG. 6. With this arrangement, the direction of a magnetic attractive force acting on the magnetic substance 15 is identical to the direction of the weight of the movable unit assembly acting on the bearing 10 in the Z−(minus) direction, so that the Z+(plus) side of the bearing 10 is continuously and stably kept in contact with the guide 25 even when subjected to great vibration and shock force.

In the first-mentioned embodiment, the magnetic substance 15 is provided only on the side of bearing 10 so as to urge the bearing 10 against the guide 25 under the magnetic attractive force acting on the magnetic substance 15. When necessary, it is possible according to the invention to dispose a magnetic substance 15 on the side of the bearing 9 for attaining the same objects with respect to the bearing 9. Though not shown, two such magnetic substances 15 may be disposed on the side of the bearing 9 and the side of the bearing 10, respectively, for achieving the afore-mentioned objects of the invention.

According to the embodiments described above, the bearing 10 comprises a plain bearing. The bearing 10 may be composed of a ball bearing, for example.

The magnetic substances 15 described with respect to the respective embodiments are made of iron but they may be formed of any material which is capable of producing a magnetic attracting force or a magnetic repelling force when subjected to the magnetic flux. Magnets may be used as such magnetic substances.

The head transfer apparatus described with respect to the illustrated embodiments comprises an optical head incorporated in an optical recording/regenerating device. The present invention is also useful when embodied in a head transfer apparatus for transferring a magnetic head of a magnetic recording/regenerating device.

Furthermore, the head transfer apparatus according to the embodiments described above is used with an optical head of the so-called separate type which is composed of a fixed optical unit and a movable optical unit. Obviously, the present invention is effective when applied to such a head transfer apparatus which is constructed to transfer an integral or one-piece optical head.

Figure 7:
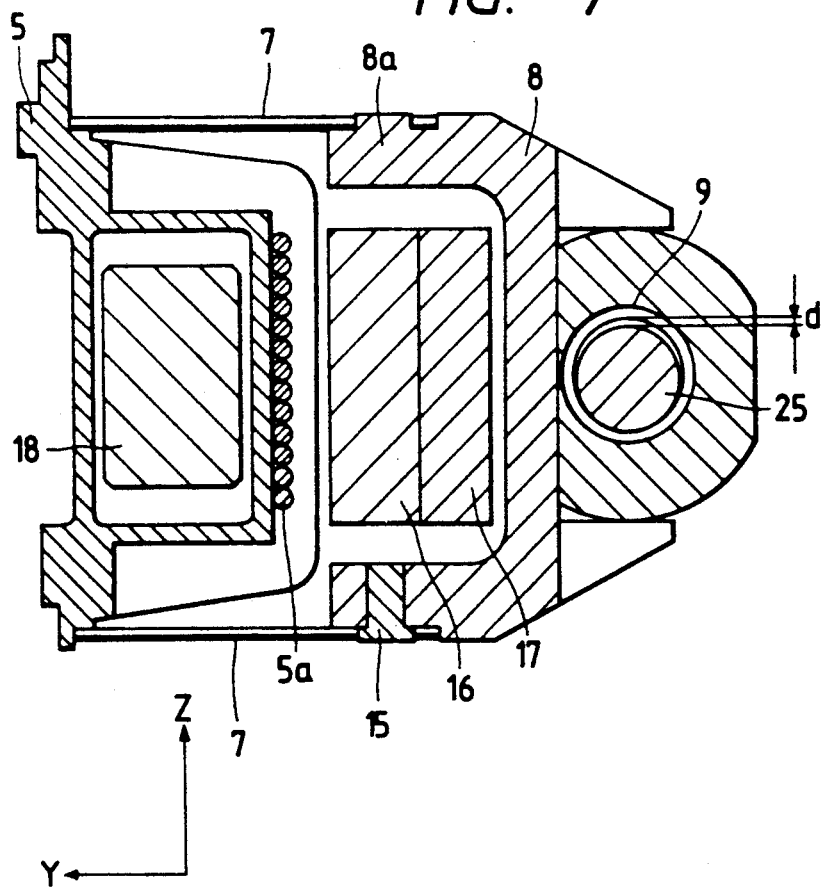
FIG. 7 is a cross-sectional view similar to FIG. 5, but showing a bearing portion according to still another embodiment of the present invention.

According to the last-mentioned embodiment shown in FIG. 7, the magnetic attractive force acting on the magnetic substance 15 in the Z+(plus) direction has an intensity slightly larger than the weight of the movable unit assembly acting on the bearing 10 in the Z−(minus) direction so as to insure sliding contact between the Z−(minus) direction side of the bearing 10 and the guide 25. In the case of necessity, the magnetic force may be set to have an intensity large enough to reduce the bearing load or pressure exerted by the weight of the movable unit assembly. As an alternative, the magnetic force may be set to a desired intensity for controlling the clearance between the bearing and the guide.

Although in the illustrated embodiments, the access coils 12a, 13a are provided separately from the tracking coils 5b, it is possible to use the tracking coils 5b as tracking coils and access coils.

In the case of the ball bearing, a presser plate spring is employed to urge the ball bearing into contact with the guide without a clearance therebetween. In the case of the plain bearing, as opposed to the ball bearing, there is a certain clearance between the bearing and the guide. It is therefore apparent that the present invention is particularly useful when embodied in a head transfer apparatus incorporating a plain bearing because the clearance between the plain bearing and the guide is controlled reliably. This is because the ball bearing based on a rolling motion involving rolling friction is not significantly influenced by the bearing pressure or load imposed by the weight of the movable unit assembly being transferred. Conversely, the plain bearing which is based on a sliding motion involving sliding friction is significantly influenced by the weight of the movable unit assembly imposed as bearing pressure or load on the plain bearing when the movable unit assembly is transferred. Such a bearing pressure involving the weight of the movable unit assembly can be lowered by the present invention so that the present invention is particularly advantageous when used with the plain bearing.

Obviously, various modifications and variations of the present invention are possible in the light of the above teaching. It is therefore to be understood that within the scope of the appended claims the invention may be practiced otherwise than as specifically described.

What is claimed is:

1. A head transfer apparatus comprising:

(a) a movable unit assembly including an element for recording information on any appropriate information track of a recording medium, regenerating the recorded information from the information track or erasing the recorded information on the track;

(b) an access coil disposed on said movable unit assembly;

(c) a magnetic circuit for causing said access coil to produce an electromagnetic force effective to transfer said movable unit assembly in a first direction perpendicular to the information track;

(d) a bearing disposed on said movable unit assembly;

(e) a guide extending through said bearing for slidably supporting said movable unit assembly in said first direction; and (f) a magnetic substance disposed on at least one portion of said movable unit assembly and operative, under the force of a leakage flux of said magnetic circuit, to produce a magnetic force acting in a second direction opposite to the direction of gravity in which the weight of said movable unit assembly acts, thereby lowering a bearing pressure imposed on at least one portion of said bearing by the weight of said movable unit assembly.

2. A head transfer apparatus as claimed in claim 1, wherein said bearing comprises a plain bearing.

* * * * *